United States Patent [19]

Maeda et al.

[11] Patent Number: 4,526,217
[45] Date of Patent: Jul. 2, 1985

[54] HEAVY DUTY PNEUMATIC RADIAL TIRES

[75] Inventors: Muneyoshi Maeda, Kodaira; Kazuyuki Endo; Hikaru Tansei, both of Higashimurayama, all of Japan

[73] Assignee: Bridgestone Tire Company Limited, Tokyo, Japan

[21] Appl. No.: 604,419

[22] Filed: Apr. 30, 1984

Related U.S. Application Data

[63] Continuation of Ser. No. 415,073, Sep. 7, 1982, abandoned.

[30] Foreign Application Priority Data

Sep. 11, 1981 [JP] Japan ............... 56-142424

[51] Int. Cl.³ .............................................. B60C 9/20
[52] U.S. Cl. ................................... 152/527; 152/534; 152/536
[58] Field of Search ...... 152/361 R, 361 FP, 361 DM

[56] References Cited

U.S. PATENT DOCUMENTS

| | | | |
|---|---|---|---|
| 3,717,191 | 2/1973 | Harrington et al. | 152/361 R |
| 3,896,869 | 7/1975 | Fujishima | 152/361 R |
| 4,169,495 | 10/1979 | Maiocchi | 152/361 DM |
| 4,235,274 | 11/1980 | Suzuki et al. | 152/361 DM |
| 4,310,043 | 1/1982 | Inoue | 152/361 R |
| 4,446,905 | 10/1981 | Tamura et al. | 152/361 DM |

FOREIGN PATENT DOCUMENTS

| | | | |
|---|---|---|---|
| 1207118 | 2/1960 | France | 152/361 R |
| 6514236 | 5/1967 | Netherlands | 152/361 R |

Primary Examiner—Lois E. Boland
Attorney, Agent, or Firm—Sughrue, Mion, Zinn, Macpeak & Seas

[57] ABSTRACT

A heavy duty pneumatic radial tire is disclosed, which comprises a carcass composed of at least one rubberized ply containing cords arranged substantially in a radial plane of the tire and a belt superimposed about a crown portion of the carcass just beneath a tread and composed of at least three rubberized belt plies. In this tire, metal cords of a first belt ply nearest to the carcass among the above belt plies are arranged at an angle of 25°–50° without crossing with metal cords of a second belt ply near the carcass next to the first belt ply with respect to a central circumferential line of the tire, and metal cords of the second belt ply and a third belt ply near the carcass next to the second belt ply, a tensile strength of each of which being 1.5–2 times that of the metal cord of the first belt ply, are arranged at an angle of 10°–30° and smaller than the cord angle of the first belt ply with crossing with each other between these two belt plies with respect to the central circumferential line of the tire.

5 Claims, 6 Drawing Figures

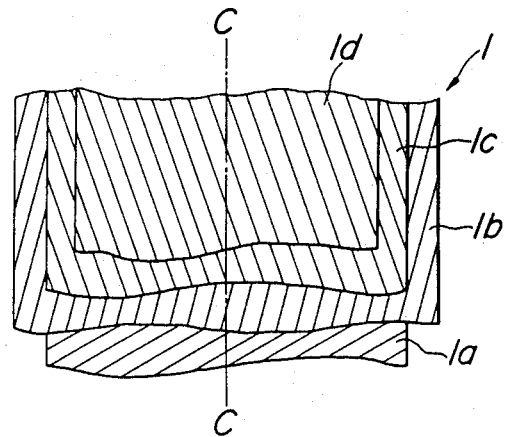
FIG_1
PRIOR ART
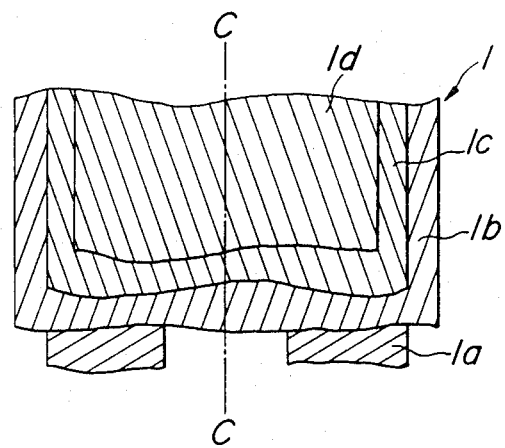
FIG_2
PRIOR ART

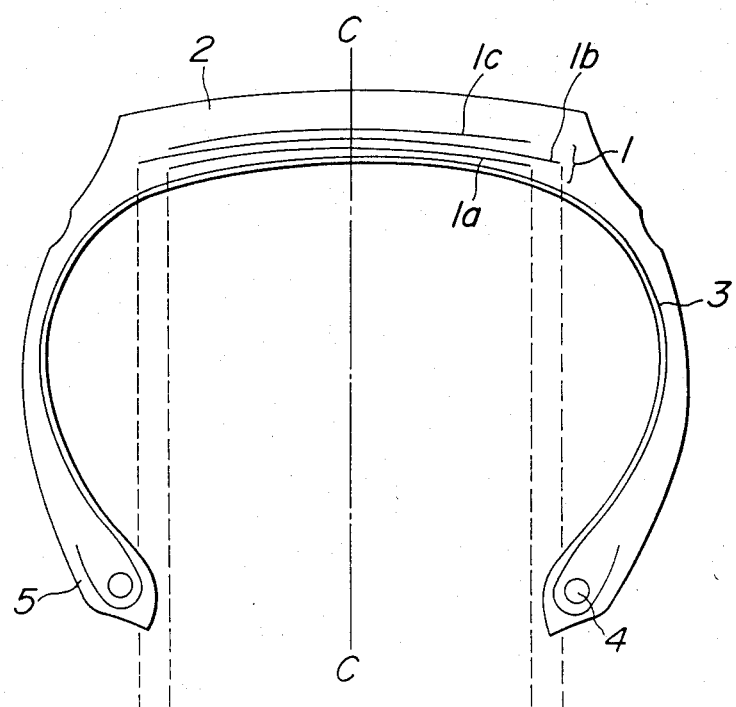
FIG. 3
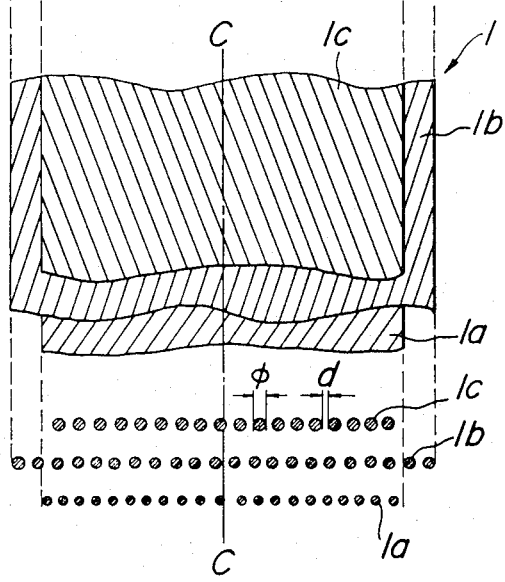
FIG. 4a
FIG. 4b

HEAVY DUTY PNEUMATIC RADIAL TIRES

This application is a continuation of application Ser. No. 415,073, filed Sept. 7, 1982 now abandoned.

This invention relates to heavy duty pneumatic radial tires, and more particularly to an improvement of a belt structure in this type of the tire for use in truck, bus and the like not only continuously running on good roads at a high speed but also using on a running road inclusive of bad roads such as the usual non-paved road or construction sites.

In general, it is well-known that the belt of the radial tire must simultaneously satisfy contrary dynamic properties in use on both good and bad roads.

That is, when a radial tire is used on a good road, it is desired to have a belt structure where the rigidity is high and deformation is difficult in order not only to bear the tension under internal pressure but also not to produce interlaminar separation of the belt (hereinafter referred to as good-road separation) due to high heat build-up and mechanical inputs by side force caused even when running at high speed.

On the other hand, when a radial tire is used on a bad road surface, it is desired to have a belt structure wherein the rigidity is low and the deformation is easy in order not only to bear the tension under internal pressure but also not to produce interlaminar separation of the belt or separation between belt and tread rubber (hereinafter referred to as bad-road separation) due to mechanical inputs caused when running on undulations such as stones, protrusions or the like scattered on road surface at low to middle speeds rather than high speed.

Therefore, when a radial tire is used on the running road consisting mainly of a good road but including a bad road surface, the belt of this tire must simultaneously satisfy such contrary requirements as described above.

Hitherto, there have been proposed various belt structures in the radial tire running on both good and bad roads, but any one of these structures still did not satisfy either one of the contrary requirements.

For instance, there is proposed a belt structure wherein cords in all of plural plies constituting the belt are arranged at a relatively small angle with respect to the central circumferential line of the tire (cord angle described hereinafter means an angle inclined with respect to the central circumferential line). However, since this belt structure has no cord ply having a larger cord angle, a so-called triangle construction for ensuring the rigidity is not formed when the cords of all plies are projected on a plane. Hence when in use on a good road, the shearing strain increases between the plies of the belt to produce a large heat build-up.

A conventional belt structure for use on good road is shown in FIG. 1 wherein the belt 1 comprises four belt plies 1a-1d and the cord angle of the first belt ply 1a located inward in the radial direction of the tire or nearest to the carcass is usually made as large as about 60° and cord angles of the second to fourth belt plies 1b, 1c and 1d are made relatively small. In this case, the effect by triangle construction is sufficient and the rigidity is high, so that there is no problem relating to good-road separation but, the resistance to bad-road separation is extremely deteriorated.

In order to improve the resistance to bad-road separation in the conventional tire of FIG. 1, there is also proposed a belt structure as shown in FIG. 2 wherein the cord angle of each belt ply is the same as in FIG. 1 and only the middle part of the first belt ply 1a is drawn out. In this case, the rigidity of the central region in the belt is reduced but the rigidity near the shoulder portion cannot be reduced, so that the resistance to bad-road separation at the belt end is not necessarily improved sufficiently.

It is, therefore, an object of the invention to eliminate the aforementioned drawbacks of the prior art and to provide a belt structure suitable for the tire of this type capable of advantageously using on both good and bad roads.

According to the invention, there is provided in a heavy duty pneumatic radial tire comprising a carcass composed of at least one rubberized ply containing cords arranged substantially in a radial plane of the tire and a belt superimposed about a crown portion of the carcass just beneath a tread and composed of at least three rubberized belt plies each containing cords therein, the improvement wherein a first belt ply nearest to said carcass among said plies of the belt contains metal cords, which cords being arranged at an angle of 25° to 50° without crossing with metal cords of a second belt ply near said carcass next to said first belt ply with respect to a central circumferential line of the tire, and said second belt ply and a third belt ply near said carcass next to said second belt ply contain metal cords, whose tensile strength being 1.5 to 2 times that of the metal cord of said first belt ply, said metal cords of the second and third belt plies are arranged at an angle of 10° to 30° and smaller than the cord angle of said first belt ply with crossing with each other between these two belt plies with respect to the central circumferential line of the tire.

The invention will now be described in detail with reference to the accompanying drawings, wherein:

FIGS. 1 and 2 are partially schematic developed views of the belt structure in the conventional tire, respectively;

FIG. 3 is an equatorial sectional view of an embodiment of the tire according to the invention;

FIGS. 4a and 4b are a partially schematic developed view and a sectional view of the belt structure in the tire of FIG. 3, respectively.

Figure 5:
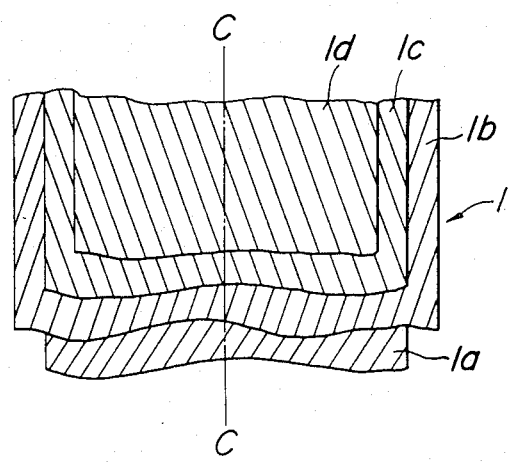
FIG. 5 is a partially schematic developed view of another embodiment of the belt structure in the tire according to the invention.

In FIG. 3 is shown in an equatorial section an embodiment of the heavy duty pneumatic radial tire according to the invention, whose structure is the same as in the conventional heavy duty pneumatic radial tire except an internal structure of a belt 1. In FIG. 3, numeral 2 is a tread and numeral 3 is a carcass composed of at least one rubberized ply containing metal cords substantially arranged in a radial plane of the tire. In the illustrated embodiment, a single ply of metal cords is used as the carcass, but plural plies or at least one ply of organic fiber cords may be used in accordance with use purposes. Numeral 4 is a bead wire and numeral 5 is a bead portion usually provided with the other reinforcing layer not shown in FIG. 3.

The belt 1 comprises at least three rubberized belt plies each containing metal cords, particularly steel cords therein. These plies are called as first belt ply 1a, second belt ply 1b . . . in the order near the carcass 3.

Now, the inventors have made studies from various examinations with respect to an optimum point satisfying the contrary properties required on both good and bad roads as previously mentioned and found that the aforementioned drawbacks are restrained at a minimum by such an arrangement of belt structure as shown in FIG. 4a where metal cords of the second and third belt plies 1b, 1c are arranged at an angle of 10°–30°, preferably 15°–25° with crossing with each other between these plies with respect to a central circumferential line C—C of the tire and at the same time metal cords of the innermost first belt ply 1a are arranged at an angle of 25°–50°, preferably 30°–40° and larger than the cord angles of the second and third belt plies without crossing with the metal cords of the second belt ply 1b with respect to the central circumferential line C—C.

According to the invention, the cord angle of the first belt ply is particularly important. That is, when this cord angle is less than 25°, the sufficient rigidity by cooperation with the second and third belt plies or by the triangle construction is not obtained and there is still a problem in the resistance to good-road separation due to heat build-up. When the cord angle exceeds 50°, the effect by the triangle construction becomes excessive and the rigidity is very high and hence the resistance to bad-road separation is deteriorated. When the cord angle is within a range of 25°–50°, all of these problems described above are fairly alleviated and as a result, the use on both good and bad roads becomes optimum.

Moreover, when the cords of the first belt ply 1a is crossed with those of the second belt ply 1b with respect to the central circumferential line C—C or when the cords of the first belt ply 1a are directed to upward-right with respect to the line C—C as shown in FIG. 4a and the cords of the second belt ply 1b are directed to upward-left with respect to the line C—C contrary to FIG. 4a, the number of crossed plies apt to cause separation increases and also the rigidity increases superfluously and hence the resistance to both good-road and bad-road separations lowers.

Further, the cords of the second and third belt plies are necessary to cross with each other at the above defined angle with respect to the central circumferential line C—C because they must fundamentally bear the tension under internal pressure. When the cord angle in the second and third belt plies is less than 10°, the resistance to good-road separation due to heat build-up and the resistance to bad-road separation due to mechanical inputs are deteriorated together, while when the cord angle exceeds 30°, it is difficult to bear the tension under internal pressure and the diameter of the tire increases to cause premature separation failure.

The effect by optimizing the cord angle of the belt, particularly the cord angle of the first belt ply can be further enhanced when the tensile strength of the cord in the second and third belt plies is 1.5 to 2 times, preferably 1.6 to 1.8 times that of the first belt ply. Thus, there is first realized the belt structure advantageously usable for both good and bad roads.

When the tensile strength of the cord in the second and third belt plies is less than 1.5 times that of the first belt ply, the bearing of tension under internal pressure by the first belt ply increases and the rigidity becomes higher and consequently the resistance to bad-road separation is deteriorated, while when the tensile strength exceeds 2 times, the effect of the first belt ply is inversely small and the rigidity lowers to cause a problem in the resistance to good-road separation.

When the tensile strength of the cord in the second and third belt plies is made larger as described above, it is desirable that a ratio of cord distance (d) to cord diameter ($\phi$) in each of the second and third belt plies is within a range of 0.4–0.7, preferably 0.5–0.6. When the ratio d/$\phi$ is less than 0.4, the cord distance is relatively small and it is apt to cause bad-road separation failure. When the ratio exceeds 0.7, the tension under internal pressure is not sufficiently carried and it is apt to cause premature separation failure. Moreover, as used herein the cord distance d means a space between the adjoining cords in the same ply viewed as a section including the rotational axis of the tire as shown in FIG. 4b. The cord diameter $\phi$ is also measured in the above mentioned section.

In the first belt ply, the ratio of cord distance d to cord diameter $\phi$ is preferably to be within a range of 0.8–1.3, more particularly 0.9–1.1 in order to further optimize the rigidity of the belt by the cooperation with the second and third belt plies. When the ratio d/$\phi$ is less than 0.8, the resistance to bad-road separation is deteriorated by the increase of the rigidity, while when the ratio d/$\phi$ exceeds 1.3, the effect of the triangle construction with the first belt ply is too small and the rigidity reduces, so that not only the resistance to good-road separation due to heat build-up is deteriorated, but also the resistance to cut penetration on bad roads comes into question owing to the large cord distance.

By taking the above construction is first achieved the belt structure sufficiently suitable for use on both good and bad roads. According to the invention, as shown in FIG. 5 the belt is not only composed of three belt plies each containing metal cords therein as shown in FIG. 4 but also may include at least one additional belt ply 1d containing cords such as metal cord, organic fiber cord or the like, which is located outside the above three belt plies or at a side near the tread for buffing mechanical inputs on bad road. In the latter case, the mitigation of mechanical inputs on a bad road is particularly effective when the elongation at breaking of the cord in the additional belt ply 1d is not less than 1.5 times those of the first to third belt plies.

The invention will be described in comparison with the tires of the prior art.

A test tire A according to the invention has a size of 10.00 R 20 and a belt composed of four belt plies as shown in FIG. 5, details of cord angle and the like of which being shown together with those of a control tire as the prior art in the following Table 1. Moreover, the internal structure of the test tire A itself except the belt is the same as in a typical radial tire as shown in FIG. 3.

The belt structure of control tires B and C as the prior art is composed of four belt plies as shown in FIGS. 1 and 2. The details of the control tire B are shown in Table 1 as mentioned above. The control tire C has the same belt structure as in the control tire B except that the middle part of the first belt ply 1a in the control tire B is drawn out at a region corresponding to about 35% of the width of the first belt ply. The tire structure of the control tires except the belt is the same as in the test tire A.

Moreover, the cord material in all of the belt plies is steel.

TABLE 1

|  |  | First belt ply 1a | Second belt ply 1b | Third belt ply 1c | Fourth belt ply 1d |
|---|---|---|---|---|---|
| Test tire A | Cord angle | 35° to right | 20° to right | 20° to left | 20° to left |
|  | d/$\phi$ | 0.9 | 0.5 | 0.5 | 0.8 |
|  | Tensile | 165 kg | 280 kg | 280 kg | 100 kg |

TABLE 1-continued

|  |  | First belt ply 1a | Second belt ply 1b | Third belt ply 1c | Fourth belt ply 1d |
|---|---|---|---|---|---|
| Control tire B | strength of cord (Index) | (100) | (170) | (170) | (61) |
| | Cord angle | 60° to right | 20° to right | 20° to left | 20° to left |
| | d/φ | 0.5 | 0.3 | 0.3 | 0.3 |
| | Tensile strength of cord (Index) | 165 kg (100) | 165 kg (100) | 165 kg (100) | 165 kg (100) |

Each of these three tires is practically tested on road to obtain results as shown in the following Table 2.

The test is performed on three kinds of roads, i.e. 100% good road, 100% bad road and road consisting of 70% good road and 30% bad road. After the running over a distance of 20,000 km, the length of crack produced between the second and third belt plies at their ply ends is measured, from which the resistance to separation failure is evaluated by an index on a basis that the control tire B is 100.

TABLE 2

|  | 100% good road | 100% bad road | 70% good road 30% bad road |
|---|---|---|---|
| Test tire A | 100 | 35 | 50 |
| Control tire B | 100 | 100 | 100 |
| Control Tire C (drawing out of middle part of first belt ply) | 110 | 50 | 75 |

As apparent from Table 2, the resistance to separation failure especially on bad road in the tire according to the invention is considerably improved as compared with those of the conventional tires.

As mentioned above, the invention can provide a belt structure suitable for use in the heavy duty pneumatic radial tires obliged to use on both good and bad roads, which solves the drawbacks of the prior art and hardly produce separation failure and the like under use conditions on both good and bad roads.

What is claimed is:

1. A heavy duty pneumatic radial tire comprising; a carcass composed of at least one rubberized ply containing cords arranged substantially in a radial plane of the tire and a belt superimposed about a crown portion of the carcass just beneath a tread and composed of at least four rubberized belt plies each containing cords therein, each ply containing cords therein, and each of the cords in at least one belt ply other than the first to third belt plies has an elongation at break of cord being not less than 1.5 times that of each of the cords in said first to third belt plies, a first belt ply nearest to said carcass among said plies of the belt contains metal cords arranged at an angle of 25° to 50° without crossing with metal cords of a second belt ply near said carcass next to said first belt ply with respect to a central circumferential line of the tire, said first belt ply having cords arranged at a ratio of the distance between adjacent cords (d) to the diameter of the cord (φ) of 0.9–1.1; and said second belt ply and a third ply near said carcass next to said second belt ply contain metal cords, whose tensile strength being 1.6 to 1.8 times that of the metal cord of said first belt ply, said metal cords of the second and third belt plies arranged at an angle of 10° to 30° and smaller than the cord angle of said first belt ply, said second and third belt plies crossing with each with respect to the central circumferential line of the tire and each of said second and third belt plies has a ratio of distance between adjacent cords (d) to diameter of the cord (φ) of 0.4–0.7.

2. The tire according to claim 1, wherein each of said second and third belt plies has a ratio of distance between cords to diameter of cord of 0.5–0.6.

3. The tire according to claim 1, wherein the cord angle of said first belt ply is 30°–40°.

4. The tire according to claim 1, wherein the cord angle of each of said second and third belt plies is 15°–25°.

5. The tire according to claim 1, wherein said belt is composed of four belt plies.

* * * * *